US007765371B2

United States Patent
Abels et al.

(10) Patent No.: US 7,765,371 B2
(45) Date of Patent: Jul. 27, 2010

(54) METHOD AND APPARATUS FOR FULL BACKUPS IN ADVANCE

(75) Inventors: Timothy Abels, Pflugerville, TX (US); Jeffrey V. Ford, Cary, NC (US)

(73) Assignee: Dell Products L.P., Round Rock, TX (US)

(*) Notice: Subject to any disclaimer, the term of this patent is extended or adjusted under 35 U.S.C. 154(b) by 382 days.

(21) Appl. No.: 11/926,299

(22) Filed: Oct. 29, 2007

(65) Prior Publication Data
US 2009/0113126 A1  Apr. 30, 2009

(51) Int. Cl.
*G06F 13/00* (2006.01)
(52) U.S. Cl. .......................................... 711/162; 714/6
(58) Field of Classification Search ................. 711/161, 711/162
See application file for complete search history.

(56) References Cited

U.S. PATENT DOCUMENTS 6,785,786 B1 * 8/2004 Gold et al. .................. 711/162
6,865,045 B2 * 3/2005 Kuriyama et al. ............. 360/60
7,062,621 B2 * 6/2006 Mizuno et al. ............... 711/162

OTHER PUBLICATIONS ibackup.com webpages, www.ibackup.com, printed Jun. 3, 2009.

* cited by examiner

*Primary Examiner*—Hetul Patel
(74) *Attorney, Agent, or Firm*—Hamilton & Terrile, LLP; Gary W. Hamilton (57) ABSTRACT

An improved system and method are disclosed for the backup and restoration of data. An init image is created for a new system. Data is uploaded from a current system and a data image is generated. The resulting data image and the init image are combined to create a combined data image, which is then stored on an on-line backup host. A copy of the combined data image is transferred to the new system. The uploaded data is extracted from the copy of the combined data image and stored on the new system in the same location as the original system. Metadata describing the location of the combined data on the new system is captured and then applied to the combined data image stored on the on-line backup host. The extracted data on the new system is compared to the current data on the original system and the new system is updated. A differential backup is performed on the new system and then uploaded to the on-line backup host, where it is associated with the combined data image.

20 Claims, 7 Drawing Sheets

METHOD AND APPARATUS FOR FULL BACKUPS IN ADVANCE

BACKGROUND OF THE INVENTION

1. Field of the Invention

Embodiments of the invention relate generally to information handling systems. More specifically, embodiments of the invention provide an improved system and method for the backup and restoration of data.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Replacing a computer system often requires migrating data stored on an existing system to a new system. One approach to migrating data between systems is through a connection to a network, such as a local area network (LAN). Another approach is to make a backup copy of the data on the existing system. For example, a backup copy of the data can be stored on a compact disk read-only memory (CD-ROM), a digital versatile disk (DVD), tape, or other removable media. Similarly, a backup copy of the data can be stored on a hard disk connected to the existing computer, such as through a universal serial bus (USB) connection. Yet another approach that has gained popularity in recent years is to store the backup copy of the data on a remote backup host that is accessed through a connection to a wide area network (WAN) such as the Internet.

Regardless of the approach, the data that is stored in the backup copy has to be restored, in part or in whole, to the new system. Generally, such data restoration is labor intensive, time consuming and error-prone. Furthermore, it is typically performed after the new system is installed, which can often result in delays before the new system can be used. One approach to addressing this issue is for the system vendor to restore the backed-up data to the new system. This generally requires sending a physical copy of the backed-up data to the system vendor for restoration, which can incur additional expense and time. Furthermore, metadata describing the backed-up data, such as its location on the original system, is often changed in the process.

In view of the foregoing, it would be advantageous to be able to upload a backup copy of the data stored on an original system to the system vendor, and then have the vendor restore the backed-up data onto the new system prior to its delivery. The restored data on the new system could then be updated with any changes that have been made to the data on the existing system since the backup copy was uploaded. As a result, only incremental updates would be needed on the new system instead of a complete restore, thereby reducing the time needed to synchronize the data on the two systems.

SUMMARY OF THE INVENTION

An improved system and method are disclosed for the backup and restoration of data on an information handling system. In one embodiment, a customer places an order for an information handling system and an init image is created. In one embodiment, the init image comprises, but is not limited to, an operating system (OS), device drivers, application software files, associated configuration files, and other information required for the operation of the new system. Concurrently, the customer uploads data from a current system to an on-line backup host. Once the upload of the customer data is completed, a customer data image is generated. In one embodiment, differential backups are periodically performed on the current system once an initial data upload is completed. The differential backups are then applied to the customer data image. The resulting customer data image and the init image are then combined to create a combined init and customer data image.

The combined init and customer data image is then stored on the on-line backup host. In one embodiment, a copy of the combined init and customer data image is transferred to the new system. The new system is then shipped to the customer. Once the new system is received by the customer, the uploaded customer data is extracted from the copy of the combined init and customer data image and stored on the new system. Metadata describing the location of the customer data on the new system is captured and then applied to the combined init and customer data image stored on the on-line backup host. The extracted customer data on the new system is then compared to the current customer data on the original information handling system and diff data is generated. The diff data for customer data that has changed on the original information handling system is then applied to the migrated customer data on the new information handling system. A differential backup is performed on the new system and is then uploaded to the on-line back-up host where it is associated with the combined init and customer data image for the new information handling system.

In another embodiment, a customer uses a network portal to submit a data restoration request to the on-line backup host. The combined init and customer data image for the target system is retrieved from the on-line backup host. Any differential backups associated with the combined init and customer data image is located and retrieved, and then applied to the combined init and customer data image. Once the incremental backups have been applied, a data restoration image is created and then stored on the on-line backup host. If a full image restore is required, a copy of the data restoration image is transferred to the target information handling system through the network portal. The uploaded customer data is then extracted from the copy of the data restoration image. If only a subset of uploaded customer data is to be restored, then the subset is extracted from the data restoration image stored on the on-line backup host. As the uploaded customer data is extracted, metadata is used to store the extracted data in its original location on the target information handling system. The extracted data is compared to data currently stored on the target system to generate diff data, which is then uploaded to the on-line backup host where it is associated with the data restoration image for the target information handling system.

A differential backup is then performed to capture any changes to the customer data that may have occurred as a result of the restoration process. Those of skill in the art will understand that many such embodiments and variations of the invention are possible, including but not limited to those described hereinabove, which are by no means all inclusive.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

The present invention provides a system and method for the backup and restoration of data on an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
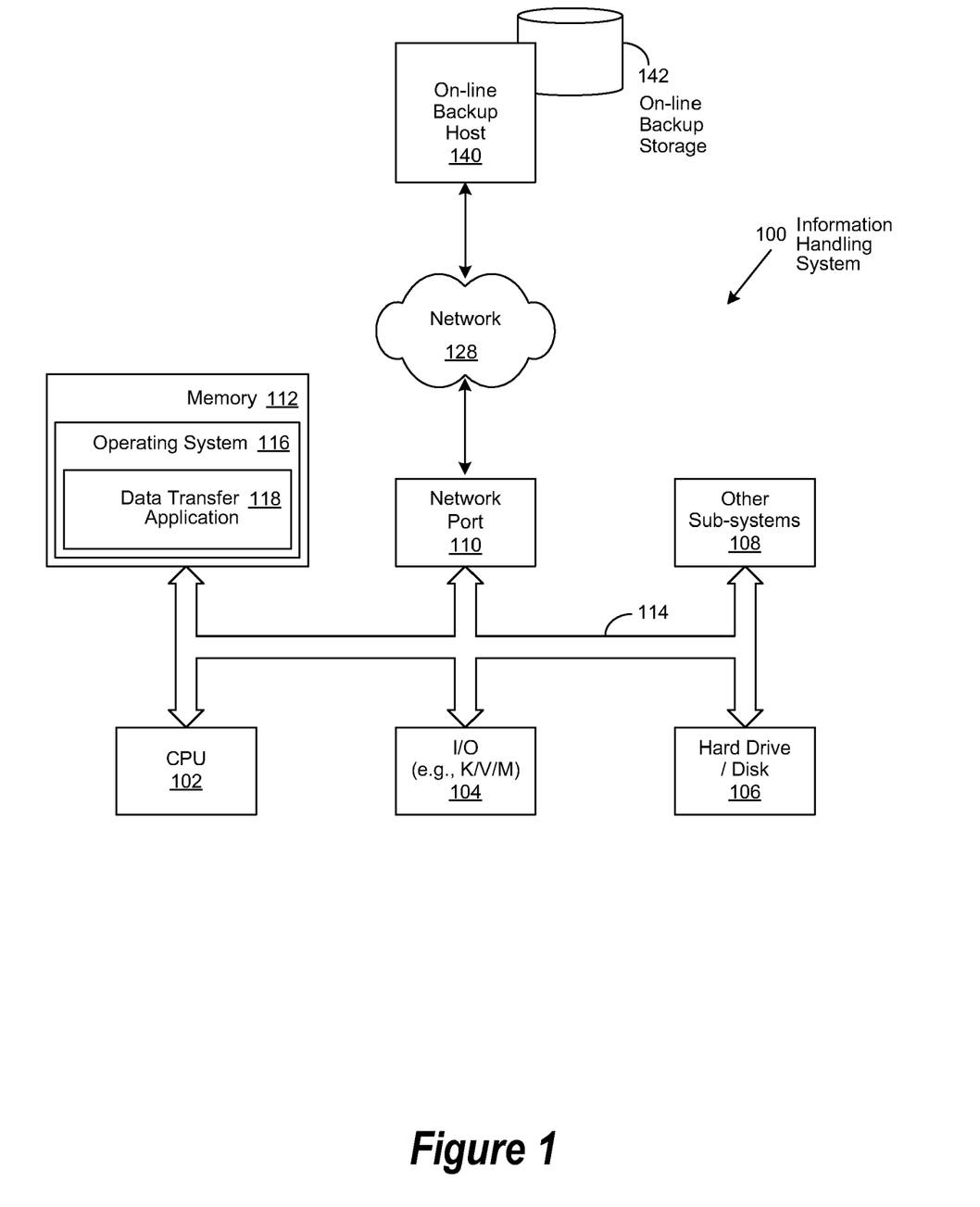
FIG. 1 is a general illustration of components of an information handling system as implemented in the system and method of the present invention.

FIG. 1 is a generalized illustration of an information handling system 100 that can be used to implement the system and method of the present invention. The information handling system includes a processor (e.g., central processor unit or "CPU") 102, input/output (I/O) devices 104, such as a display, a keyboard, a mouse, and associated controllers, a hard drive or disk storage 106, various other subsystems 108, network port 110 operable to connect to a network 128, and system memory 112, all interconnected via one or more buses 114. System memory 112 further comprises operating system (OS) 116 and data transfer application 118.

The data transfer application is operable to connect the information handling system 100 through the network 128 to the on-line backup host 140, which comprises on-line backup storage 142. Once connected, the data transfer application is further operable to upload backup data from the hard drive or disk storage 106 for storage on the on-line backup storage 142 of on-line backup host 140. The data transfer application is similarly operable to download backup data from the on-line backup storage 142 of on-line backup host 140 to the hard drive or disk storage 106 for restoration.

Figure 2:
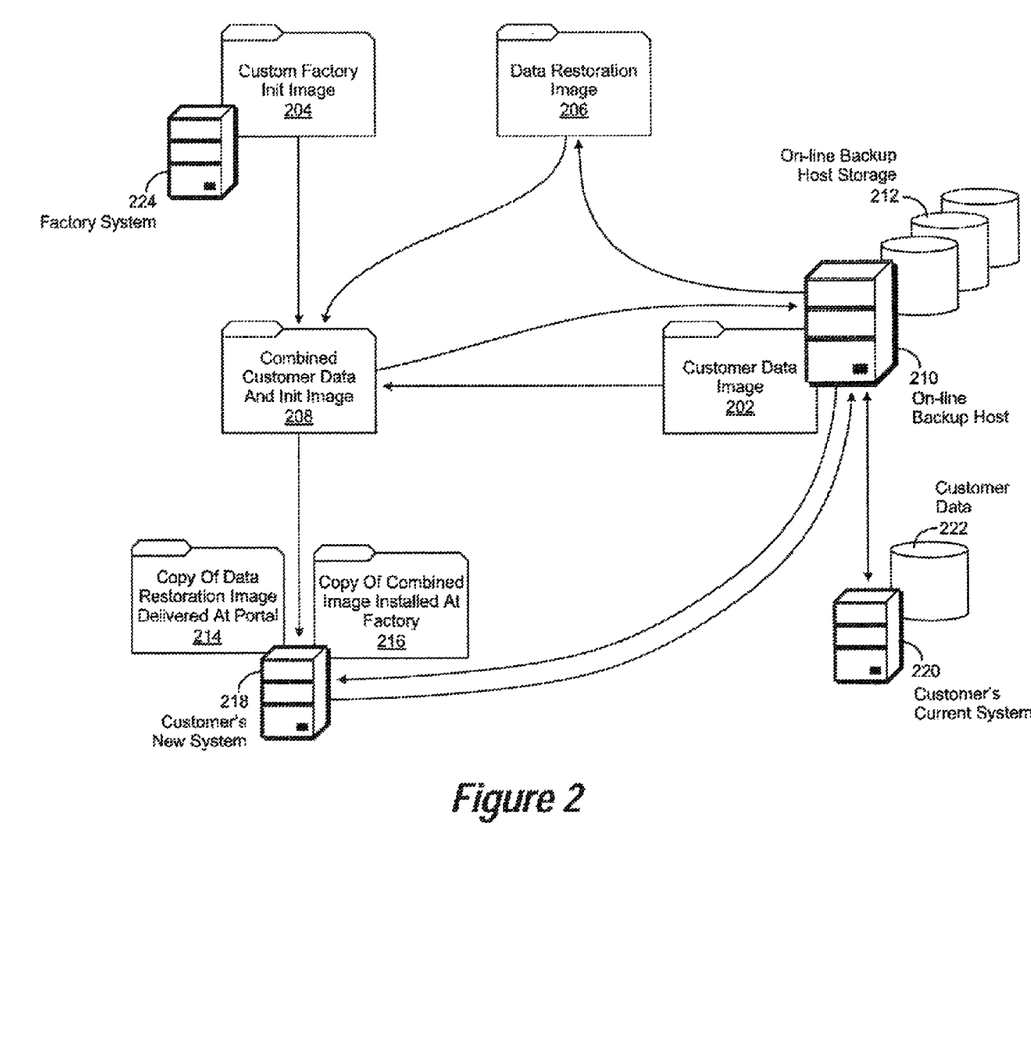
FIG. 2 is a simplified block diagram illustrating backup and restoration operations as implemented in accordance with an embodiment of the invention.

FIG. 2 is a simplified block diagram illustrating backup and restore operations as implemented in accordance with an embodiment of the invention. In one embodiment, a customer places an order for an information handling system with a specified configuration. An init image 204 for the specified configuration is created by a factory system 224. In one embodiment, the init image comprises, but is not limited to, an operating system (OS), device drivers, application software files, associated configuration files, and other information required for the operation of the new information handling system. Concurrently, the customer uploads data 222 from a current system 220 to a storage device 212 of an on-line backup host 210. Once the upload of the customer data is completed, a customer data image 202 is generated. In one embodiment, differential backups are periodically performed on the current system once an initial data upload is completed. The differential backups are then applied to the customer data image 202. Once any differential backups have been applied, the customer data image 202 and the init image 204 are combined to create a combined init and customer data image 208.

The combined init and customer data image 208 is then stored on the on-line backup host 210. In one embodiment, a copy of the combined init and customer data image 216 is transferred to the new information handling system 218. Metadata describing the location of the customer data on the new system is captured and then applied to the combined init and customer data image stored on the on-line backup host 210. The original CRC values of the customer data prior to the application of the metadata is preserved to allow for any customer data that was transformed during the migration to be marked for updating in the on-line backup host 210. Skilled practitioners of the art will realize that the application of location metadata from the new system to the combined init and customer data image 208 effectively creates a backup of the customer data on the new system.

The information handling system 218 is then shipped to the customer. Once the information handling system 218 is received by the customer, the uploaded customer data is extracted from the copy of the combined init and customer data image 216 and stored on the new information handling system 218. The extracted customer data on the new information handling system 218 is then compared to the current customer data on the original information handling system and diff data is generated. The diff data for customer data that has changed on the original information handling system is then applied to the migrated customer data on the new information handling system. A differential backup is performed on the new system and is then uploaded to the on-line back-up host 210 where it is associated with the combined init and customer data image 212 for the new information handling system 218.

In another embodiment, on-line data restoration and migration operations are begun with a customer using a network portal to submit a data restore or migration request to the on-line backup host 210. The combined init and customer data image 212 for the target system 218 is then retrieved from the on-line backup host 210. Any differential backups associated with the combined init and customer data image 212 is located and retrieved, and then applied to the combined init and customer data image 212.

Once the incremental backups have been applied to the combined init and customer data image 212, a data restoration image 206 is created and used in place of the combined init and customer data image 212. The data restoration image 206 is then stored on the on-line backup host 210. A determination is made whether a full image restore is required or only a restore of a subset of the data contained in the data restoration image. If a full image restore is required, then a copy of the data restoration image 214 is transferred to the target information handling system 218 through the network portal. The uploaded customer data is then extracted from the copy of the data restoration image 214. However, if only a subset of the data contained in the data restoration image is to be restored, then the subset is extracted from the data restoration image 206 stored on the on-line backup host 210.

As the uploaded customer data is extracted, metadata extracted from the data restoration image is used to store the extracted data in its original location on the target information handling system 218. A differential backup is then performed to capture any changes to the customer that may have occurred as a result of the restoration process. The differential backup is then uploaded to the on-line backup host 210 where it is associated with the data restoration image 206 for the target information handling system 218.

Figure 3A:
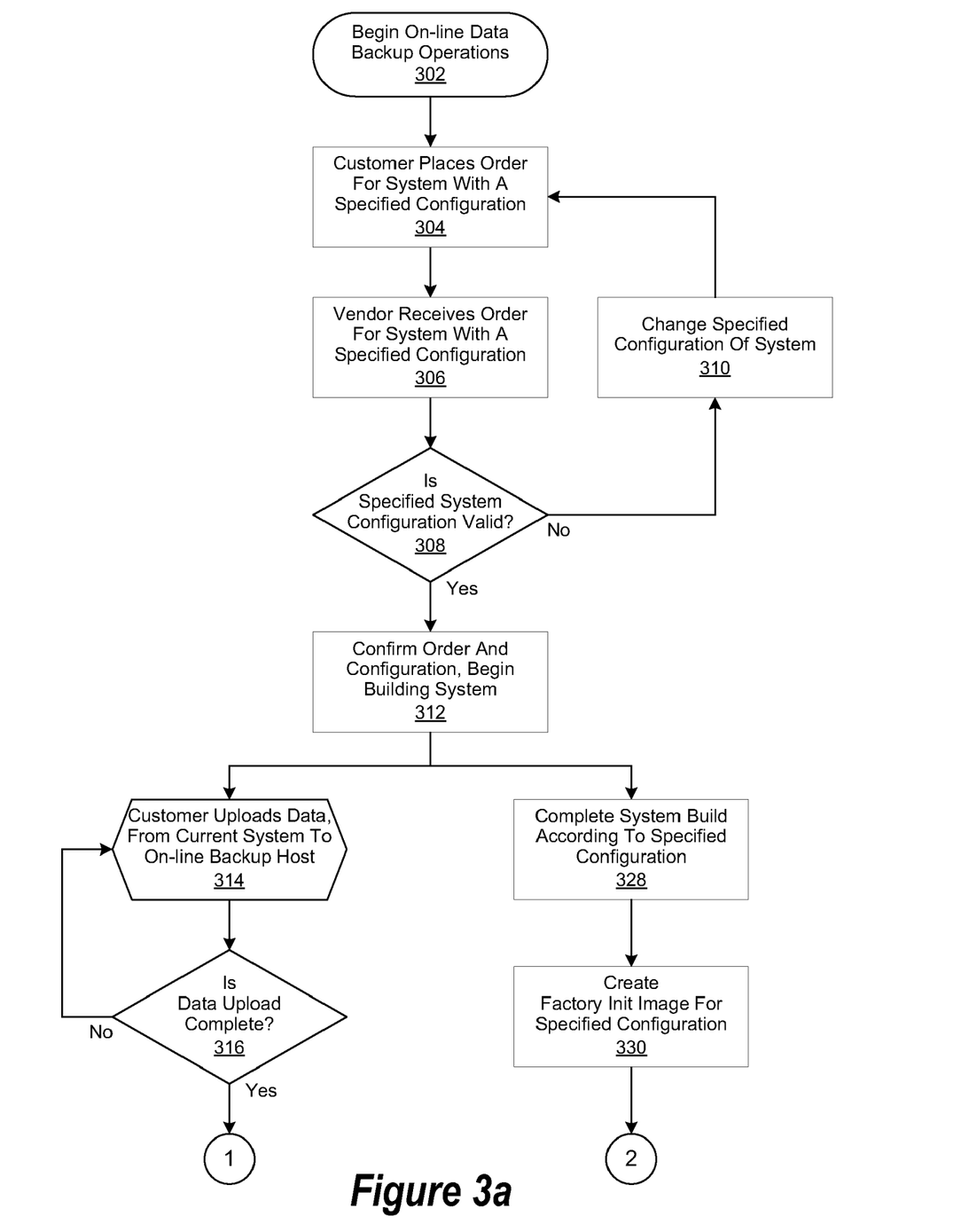
FIGS. 3a-c are a flowchart illustrating data backup operations as implemented in accordance with an embodiment of the invention.
Figure 3B:
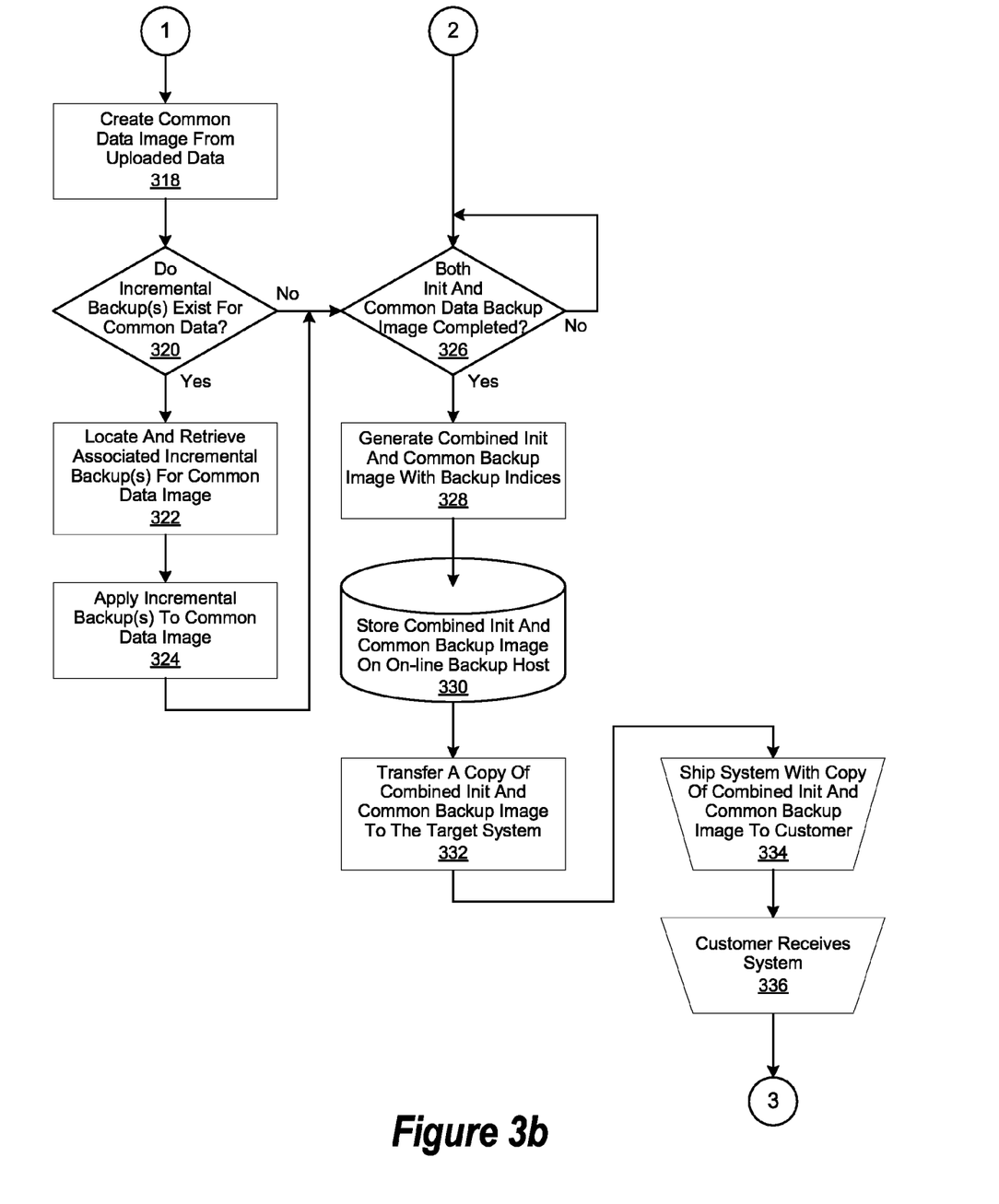
Figure 3C:
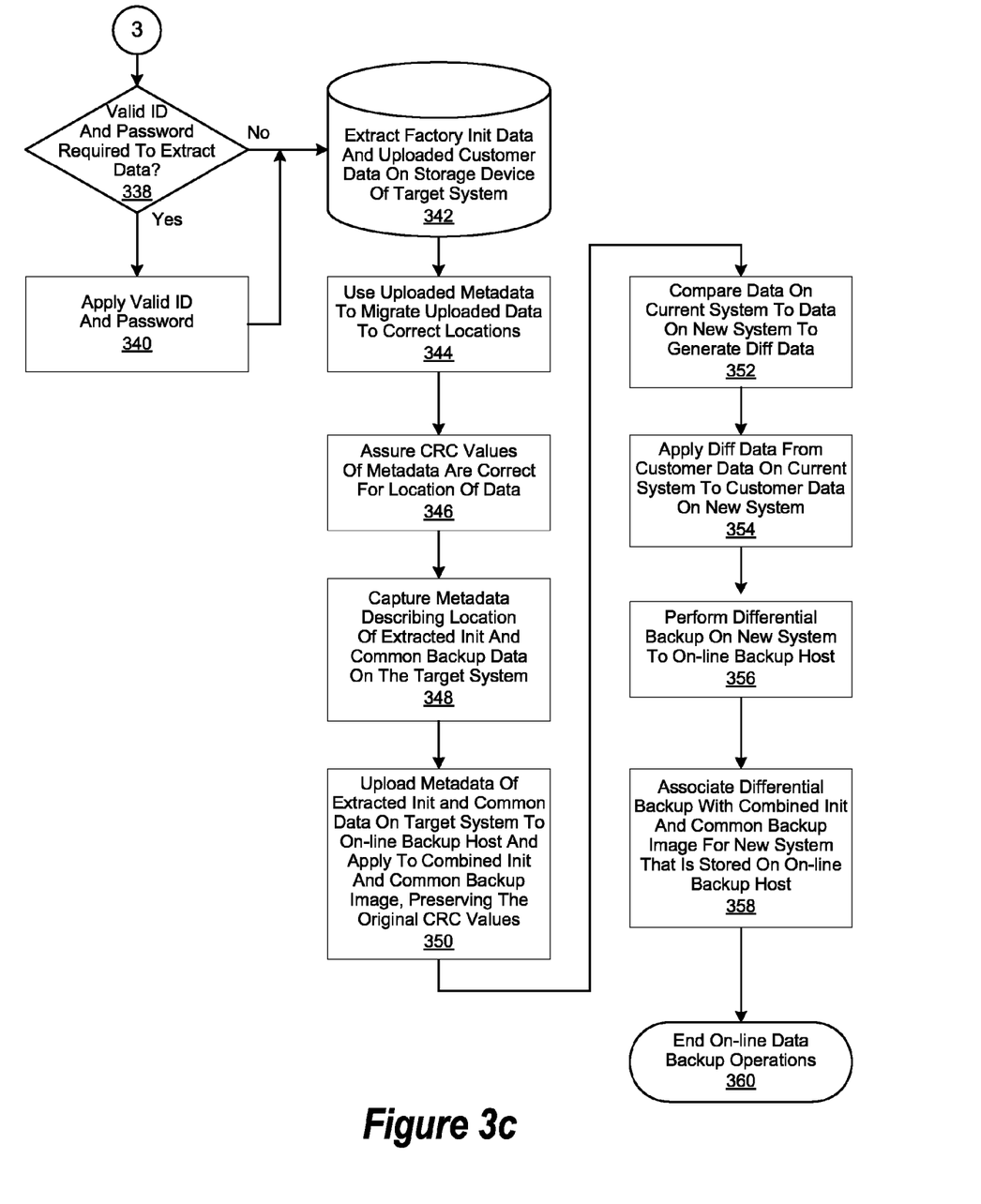

FIGS. 3*a-c* are a flowchart illustrating data backup operations as implemented in accordance with an embodiment of the invention. In this embodiment, on-line data backup operations begin in step 302, followed by a customer placing an order for an information handling system with a specified configuration in step 304. The order for the information handling system is received by the vendor in step 306, followed by a determination being made in step 308 whether the specified configuration of the information handling system is valid. If it is not, then the specified configuration of the information handling system is changed in step 310 and the process is repeated, beginning with step 304. If it is determined in step 308 that the specified configuration is valid, then the order is confirmed and the vendor begins building of the information handling system in step 312.

The on-line data backup operations process is then forked. In one process fork, the building of the information handling system according to the specified configuration is completed in step 328. Then, in step 330, an init image for the specified configuration is created in step 330. In one embodiment, the init image comprises, but is not limited to, an operating system (OS), device drivers, application software files, associated configuration files, and other information required for the operation of the new information handling system.

Concurrently in another process fork, the customer uploads data from a current system to an on-line backup host in step 314. A determination is made in step 316 whether the upload of the data is complete. If it is not, then the data upload process is continued, beginning with step 314. Once it is determined in step 316 that the upload of the data is completed, then a common data image is generated from the uploaded data in step 318. In one embodiment, differential backups are periodically performed on the current system once an initial data upload is completed. Accordingly, a determination is made in step 320 whether such differential backups for the common data image exist. If they do, they are located and retrieved in step 322 and then applied to the common data image in step 324. Once the differential backups have been applied in step 324, or if it is determined in step 320 that they do not exist, then the forked on-line data backup operations processes converge at step 326. In step 326, a determination is made whether image operations to generate the init image and the common data backup image are completed. If they are not, then the process in step 326 is repeated until they are. Once it is determined in step 326 that the init image and the common data backup image are complete, a combined init and common backup image is generated in step 328. Once generated, the combined init and common backup image is stored on the on-line backup host in step 330. A copy of the combined init and common backup image is transferred to the new information handling system in step 332, and the new information handling system is then shipped to the customer is step 334.

The information handling system is then received by the customer in step 336. A determination is then made in step 338 whether a valid identifier (ID) and password are required to extract the factory init data and uploaded customer data from the combined init and common data image stored on the new information handling system. If it is determined in step 338 that a valid identifier (ID) and password are required, then they are applied in step 340. Otherwise, or once the valid ID and password are applied in step 340, the factory init data and uploaded customer data is extracted from the combined init and common data image and stored on the new information handling system in step 342. Uploaded metadata extracted from the combined init and common data image is then used in step 344 to migrate the uploaded customer data to its correct locations. Once the uploaded data is migrated, its associated cyclic redundancy check (CRC) values are checked in step 346 to ensure that the uploaded customer data was migrated to the correct location.

Metadata describing the location of the combined init and common backup image on the new system is then captured in step 348. Once captured, it is then uploaded in step 350 to the on-line backup host and applied to the combined init and customer data image that was previously stored on the on-line backup host. The original CRC values of the customer data prior to the application of the metadata is preserved to allow for any customer data that was transformed during the migration to be marked for updating in the on-line backup host. Skilled practitioners of the art will realize that the application of location metadata from the new system to the combined init and customer data image effectively creates a backup of the customer data on the new system.

The migrated customer data on the new information handling system is then compared to the current customer data on the original information handling system in step 352 and diff data is generated. The diff data for customer data that has changed on the original information handling system is then applied to the migrated customer data on the new information handling system in step 358. A differential backup is then performed on the new system in step 356, which is then uploaded to the on-line backup host. Once uploaded, the differential backup is associated with its corresponding combined init and customer data image. On-line data backup operations are then ended in step 366.

Figure 4A:
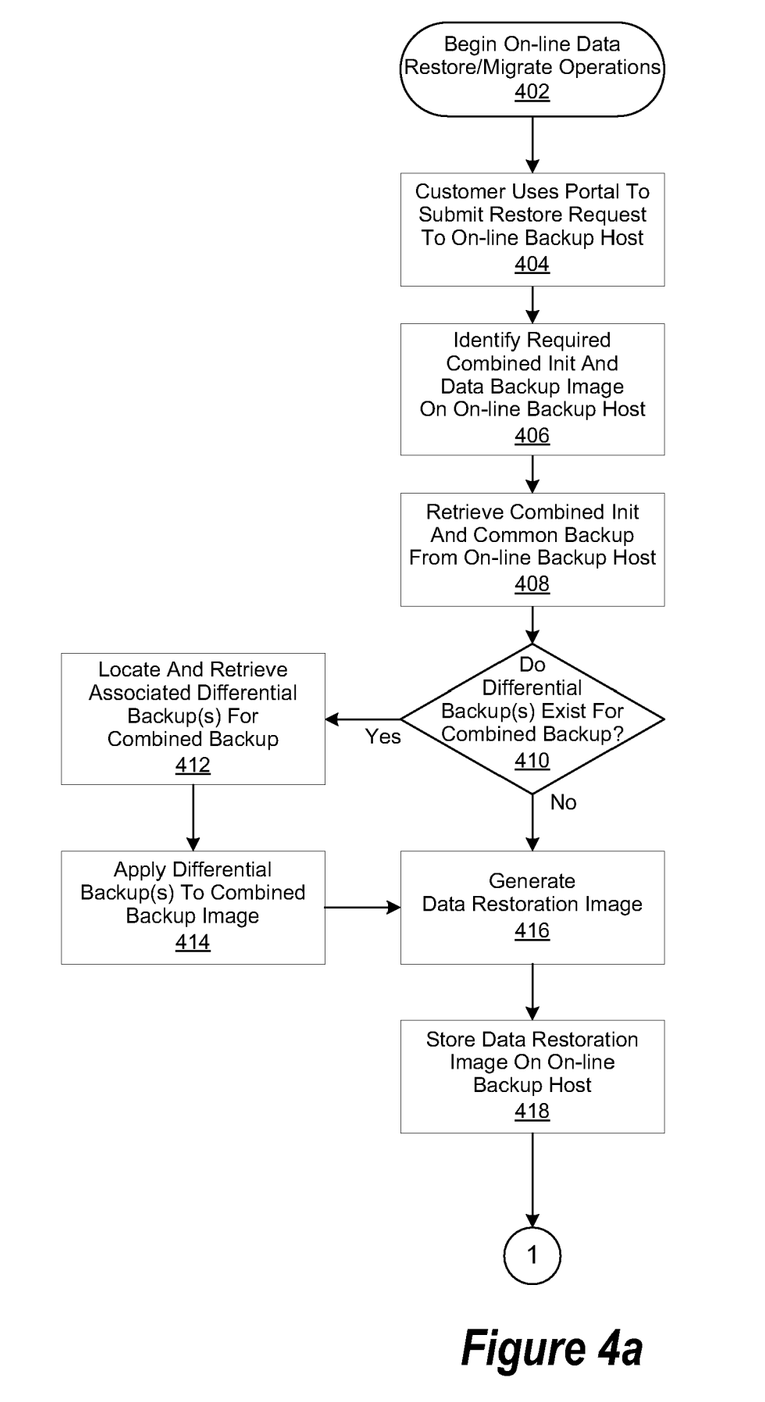
FIGS. 4a-b are a flowchart illustrating data restoration and migration operations as implemented in accordance with an embodiment of the invention.
Figure 4B:
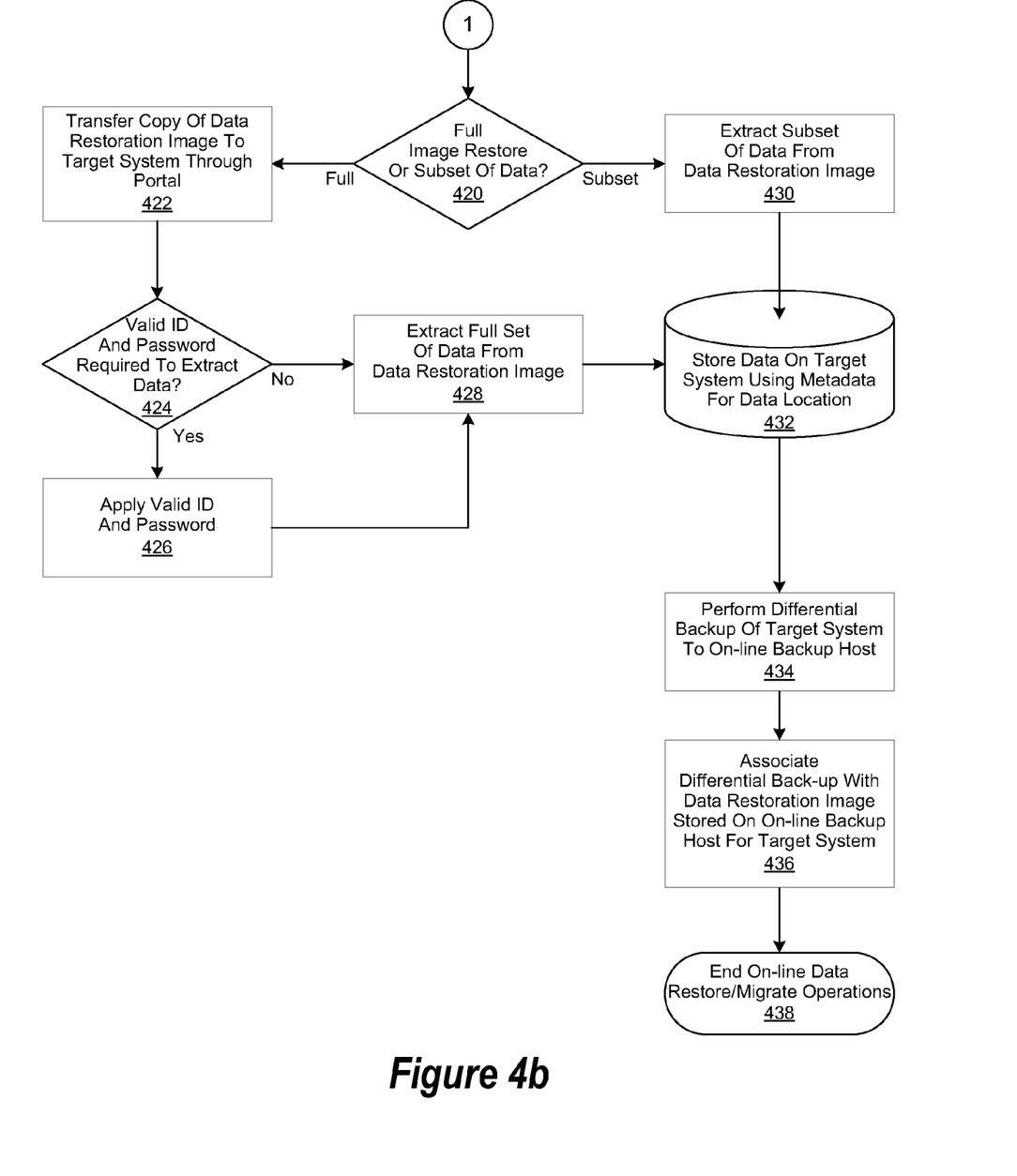

FIGS. 4*a-b* are a flowchart illustrating data restoration and migration operations as implemented in accordance with an embodiment of the invention. In this embodiment, on-line data restoration and migration operations are begun in step 402, followed by a customer using a network portal in step 404 to submit a data restore or migration request to an on-line backup host. The required combined init and common data image is identified in step 406 and then retrieved from the on-line backup host in step 408. A determination is then made in step 410 whether differential backups associated with the combined init and customer data backup image exists. If it does, then they are located and retrieved in step 412 and then applied to the combined init and customer data backup image in step 414.

Once the differential backups have been applied to the combined init and customer data backup image in step 414, or if it is determined in step 410 that no associated differential backups exist, then a data restoration image is created in step 416. The data restoration image is then stored on the on-line backup host in step 418. A determination is then made in step 420 whether a full image restore is required or only a restore of a subset of the data contained in the data restoration image. If it is determined in step 420 that a full image restore is required, then a copy of the data restoration image is transferred to the target information handling system through the network portal in step 422. A determination is then made in step 424 whether a valid identifier (ID) and password are required to extract the uploaded customer data from the transferred copy of the data restoration image. If it is determined in step 424 that a valid identifier (ID) and password are required, then they are applied in step 426. Otherwise, or once the valid ID and password are applied in step 426, the uploaded customer data is extracted from the copy of the data restoration image in step 428.

However, if it is determined in step 420 that only a subset of the data contained in the data restoration image is to be restored, then the subset is extracted from the data restoration image in step 430. Once the full set of data has been extracted from the data restoration image in step 428, or a subset of data has been extracted in step 430, the extracted data is stored on the target system in step 432. As the extracted data is stored in step 432, metadata extracted from the data restoration image is used to store the extracted data in its original location. A differential backup is then performed in step 434 to capture any changes to the customer data that may have occurred as a result of the restoration process. The differential backup is then uploaded to the on-line backup host in step 436, where it is associated with the data restoration image for the target information handling system. On-line data restoration and migration operations are then ended in step 438.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for providing data backup and restoration services, comprising:
    generating a first set of data, wherein said first set of data is stored as a first data image on a first system;
    transferring a second set of data from a second system to a third system, wherein said second set of data is stored as a second data image on said third system, said third system operable to perform data backup and restoration operations;
    combining said first and second data images to generate a third data image, wherein said third data image is stored on said third system and comprises a first set of metadata describing its location on said third system;
    transferring a copy of said third data image to a fourth system, wherein said first and second sets of data are extracted from said third data image and stored as a third set of data on said fourth system, said third set of data comprising a second set of metadata describing its location on said fourth system; and
    replacing said first set of metadata with said second set of metadata.

2. The method of claim 1, further comprising:
    generating a first set of diff data from differences between said second set of data on said second system and said third set of data on said fourth system, said differences determined by performing comparison operations between said second and third sets of data;
    updating said third set of data on said fourth system with said first set of diff data;
    transferring said first set of diff data to said third system;
    associating said first set of diff data with said third data image; and
    storing said first set of diff data on said third system.

3. The method of claim 1, further comprising:
    submitting a request to said third system to restore said updated third set of data on said fourth system;
    applying said first set of diff data to said third data image to generate a fourth set of data, said fourth set of data comprising a third set of metadata describing the location of said updated third set of data stored on said fourth system;
    generating a fourth data image from said fourth set of data, wherein said fourth data image is stored on said third system and a copy of said fourth data image is transferred to a fourth system; and
    performing a plurality of file management operations on said fourth data image to restore said fourth set of data on said fourth system, wherein said third set of metadata is used in said file management operations to store said fourth set of data in the same location on said fourth system as said updated third set of data.

4. The method of claim 1, wherein a second set of diff data is periodically generated from changes to said second set of data on said second system, said second set of diff data transferred to said third system and applied to said second data image prior to said combining of said first and second data images to generate a third data image.

5. The method of claim 1, wherein said transferring is performed using a network connection.

6. The method of claim 1, wherein said combining of said first and second data images is performed on said first system.

7. The method of claim 1, wherein a request is submitted to said third system to restore a subset of said fourth set of data, said subset of fourth set of data comprising a fourth set of metadata describing the location to restore said subset of fourth set of data on said fourth system.

8. The method of claim 7, wherein said request is submitted through a network portal.

9. The method of claim 7, wherein said subset of said fourth set of data is received through said network portal.

10. The method of claim 3, wherein said performing of said file management operations requires the application of a valid identifier (ID) and password.

11. A system for providing data backup and restoration services, comprising:
- a first set of data stored as a first data image on a first system;
- a second set of data transferred from a second system to a third system, wherein said second set of data is stored as a second data image on said third system, said third system operable to perform data backup and restoration operations;
- a third data image comprising said first and second data images, wherein said third data image is stored on said third system and comprises a first set of metadata describing its location on said third system;
- a copy of said third data image transferred to a fourth system, wherein said first and second sets of data are extracted from said third data image and stored as a third set of data on said fourth system, said third set of data comprising a second set of metadata describing its location on said fourth system; and
- a plurality of file management operations to replace said first set of metadata with said second set of metadata.

12. The system of claim 11, further comprising:
- a first set of diff data generated from differences between said second set of data on said second system and said third set of data on said fourth system, said differences determined by performing comparison operations between said second and third sets of data;
- a plurality of operations performed with said first set of diff data, comprising:
  - updating said third set of data on said fourth system with said first set of diff data;
  - transferring said first set of diff data to said third system;
  - associating said first set of diff data with said third data image; and
  - storing said first set of diff data on said third system.

13. The system of claim 11, further comprising:
- a request submitted to said third system to restore said updated third set of data on said fourth system;
- a fourth set of data, wherein said fourth set of data is generated by applying said first set of diff data to said second data image, said fourth set of data comprising a third set of metadata describing the location of said updated third set of data stored on said fourth system;
- a fourth data image generated from said fourth set of data, wherein said fourth data image is stored on said third system and a copy of said fourth data image is transferred to a fourth system; and
- a plurality of file management operations performed on said fourth data image to restore said fourth set of data on said fourth system, wherein said third set of metadata is used in said file management operations to store said fourth set of data in the same location on said fourth system as said updated third set of data.

14. The system of claim 11, wherein a second set of diff data is periodically generated from changes to said second set of data on said second system, said second set of diff data transferred to said third system and applied to said second data image prior to said combining of said first and second data images to generate a third data image.

15. The system of claim 11, wherein said transferring of said second set of data is performed using a network connection.

16. The system of claim 11, wherein said combining of said first and second data images is performed on said first system.

17. The system of claim 13, wherein a request is submitted to said third system to retrieve a subset of said fourth set of data, said subset of fourth set of data comprising a fourth set of metadata describing the location to restore said subset of fourth set of data stored on said fourth system.

18. The system of claim 17, wherein said request is submitted through a network portal.

19. The system of claim 17, wherein said subset of said fourth set of data is received through said network portal.

20. The system of claim 13, wherein said performing of said file management operations requires the application of a valid identifier (ID) and password.

* * * * *